United States Patent
Cuiffo et al.

(10) Patent No.: US 9,312,887 B2
(45) Date of Patent: Apr. 12, 2016

(54) HARDWARE ABSTRACTION LAYER (HAL) CONFIGURATION FOR SOFTWARE DEFINED RADIO (SDR) PLATFORMS

(75) Inventors: George A. Cuiffo, Edison, NJ (US); Mark P. Fleureton, Whitestone, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 743 days.

(21) Appl. No.: 13/460,966

(22) Filed: May 1, 2012

(65) Prior Publication Data
US 2012/0290823 A1    Nov. 15, 2012

Related U.S. Application Data

(60) Provisional application No. 61/483,982, filed on May 9, 2011.

(51) Int. Cl.
  *G06F 9/44* (2006.01)
  *H04B 1/00* (2006.01)
(52) U.S. Cl.
  CPC .................................. *H04B 1/0003* (2013.01)
(58) Field of Classification Search
  None
  See application file for complete search history.

(56) References Cited

U.S. PATENT DOCUMENTS

| | | | |
|---|---|---|---|
| 7,050,807 B1* | 5/2006 | Osborn | 455/445 |
| 7,404,074 B2 | 7/2008 | Murotake | |
| 7,487,493 B1* | 2/2009 | Faulkner | 717/105 |
| 7,675,852 B1* | 3/2010 | Arundale et al. | 370/229 |
| 7,835,523 B1 | 11/2010 | Mickelson et al. | |
| 7,839,169 B2 | 11/2010 | Murotake | |
| 2003/0008684 A1* | 1/2003 | Ferris | 455/561 |
| 2003/0050055 A1* | 3/2003 | Ting et al. | 455/419 |
| 2006/0015674 A1* | 1/2006 | Murotake | 711/101 |
| 2010/0318966 A1* | 12/2010 | Oh et al. | 717/120 |

* cited by examiner

*Primary Examiner* — Andy Ho
*Assistant Examiner* — Abdou Seye
(74) *Attorney, Agent, or Firm* — Leo Zucker; Daniel J. Long

(57) ABSTRACT

A method of producing a hardware abstraction layer (HAL) for software defined radio (SDR) platforms. A HAL software device in a processor of a given SDR platform operates to process data and exchange messages among a waveform software application and a waveform FPGA. A core module in the software device contains a set of software that is common to a number of different SDR platforms including the given platform, to enable the platforms to use HAL interfaces and services needed by the platforms. A custom module in the device contains software that is specific only to the FPGA of the given platform, while the core module provides the platform with the common software to enable the platform to use the HAL interfaces and services. By providing the separate custom and core modules, the overall cost of developing HALs for software radios having different hardware platforms is significantly reduced.

6 Claims, 2 Drawing Sheets

MHAL PRIORITIZED THREAD BANDING EXAMPLE

HARDWARE ABSTRACTION LAYER (HAL) CONFIGURATION FOR SOFTWARE DEFINED RADIO (SDR) PLATFORMS

CROSS REFERENCE TO RELATED APPLICATION

This application claims priority under 35 U.S.C. Sec. 119 (e) of U.S. Provisional Patent Application No. 61/483,982 filed May 9, 2011, titled Core Abstraction Layer Interface With Priorities, and incorporated herein by reference in its entirety.

BACKGROUND OF THE INVENTION

1. Field of the Invention

The present invention relates to software defined radio communications, particularly software communications architectures.

2. Discussion of the Known Art

As part of a software defined radio standard referred to as Software Communications Architecture (SCA), there is a programming module called the modem hardware abstraction layer or MHAL. For example, the MHAL allows waveform software in a SCA conforming radio to be isolated from specifics of the radio hardware that produces the waveform. That is, the hardware is "abstracted" to provide the software a simple interface (service) it can leverage to communicate with the hardware. This allows the same application to run on any radio that is compliant with the SCA (i.e., the application is said to be "portable") even though the underlying hardware may differ from one radio to another. Thus, software used to generate a particular waveform may be imported into several different sets of radio hardware.

The concept for the SCA originated from the Joint Tactical Radio System or JTRS. See, SCA Software Communications Architecture, on the Web at radio-electronics.com/info/rf-technology-design/sdr/software-communications-architecture-sca.php. Usually, the MHAL must be custom coded and tested for each different set of radio hardware on which it will reside, however.

Commonality does exist among various implementations of MHALs. It would therefore be desirable to separate such platform independent or "core" functionality from the platform specific, so that the core functionality need only be developed and tested once. Such a core module could then be reused, and efforts to implement and test platform specific portions of the MHAL from one set of radio hardware to another would be minimized. To be useful, however, the core functionality must be flexible and capable of meeting the needs of any specific radio application.

SUMMARY OF THE INVENTION

According to the invention, a method of producing a hardware abstraction layer (HAL) for software defined radio (SDR) platforms includes providing a HAL software device in a processor of a given SDR platform, and configuring the processor to process data and exchange messages among a waveform software application, and a waveform field programmable gate array (FPGA) associated with the given platform. A core module is provided in the software device and configured to contain a set of software common to a number of different SDR platforms including the given platform, to enable the platforms to use such interfaces and services as needed by the platforms. A custom module is also provided in the HAL software device and is configured to provide the given SDR platform with the software specific to the waveform FPGA of the platform, and with the common software from the core module to allow the given platform to use the HAL interfaces and services.

Because the core module is compatible with a number of different radio platforms, custom MHAL solutions can be achieved by providing the custom module with only such additional software as may required for a particular platform. This saves considerable time and money in the development of new SCA compliant software defined radio platforms.

For a better understanding of the invention, reference is made to the following description taken in conjunction with the accompanying drawing and the appended claims.

DETAILED DESCRIPTION OF THE INVENTION

Figure 1:
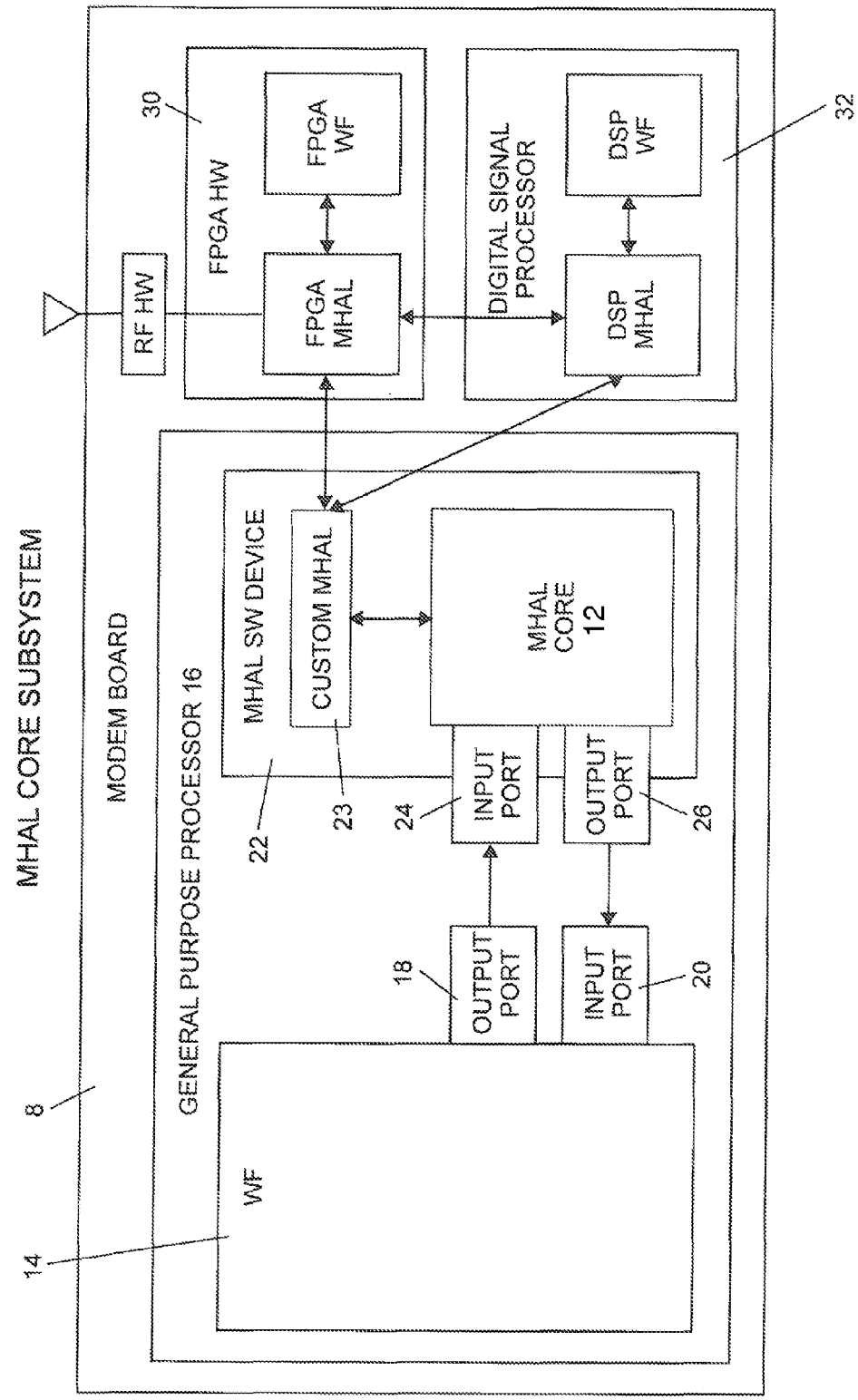
FIG. 1 is a block diagram of a modem board in a SCA compliant radio in which an inventive MHAL core module is implemented.

FIG. 1 is a block diagram of a modem board 8 in a SCA compliant radio, and in which an inventive MHAL core module 12 is implemented. The modem board 8 includes a waveform (WF) software application 14 that can be part of a general purpose processor (GPP) 16 which is configured to define an output port 18 and an input port 20 for the WF software application 14. The processor 16 also creates a MHAL software device 22 within which the MHAL core module 12 is defined.

Common GPP MHAL functionality is moved into the core module 12. Such functionality can include, for example, routing messages based on the logical destination contained within the message, and providing a standard interface for enabling the WF software application 14 to transmit a message to the core module 12 (via a module input port 24 in FIG. 1).

Functionality needed to adapt to the radio and involving a relatively small amount of software compared to that associated with the core module 12, is supplied by a custom MHAL module 23 defined in the MHAL software device 22. Such functionality may include, for example, sending messages from the GPP 16 to a field programmable gate array (FPGA) 30 of the radio over a platform specific type of hardware bus (e.g., PCI), and performing a built-in-test (BIT) function of the radio hardware. The custom MHAL module 23 may also exchange data with a digital signal processor 32 of the radio, and with the core module 12 within the device 22.

The MHAL core module 12 has a defined input port 24 and an output port 26. As mentioned, the input port 24 of the module 12 receives data from the output port 18 of the WF software application 14, and the output port 26 of the core module sends data to the input port 20 of the WF software application 14.

The custom MHAL module 23 is configured for use with a given radio hardware platform by adding or "plugging in" only a relatively small quantity of new software into the module 23, which software is adapted to use interfaces and services currently residing within the MHAL core module 12. This allows the MHAL software device 22 as a whole to interoperate with the given radio hardware platform, and makes it unnecessary to re-create an entirely new MHAL device 22 for each different platform.

To meet the needs of any given radio application, the MHAL core module 12 has the following features, detailed further below.

(a) priority thread banding—a capability to allow higher priority requests to be handled before those having lower priority, (b) thread pools—a configurable number of requests can be handled simultaneously within each priority band, and (c) memory management—since MHAL memory buffers are passed around a system to different users outside of MHAL, mechanisms are provided in the core module 12 to ensure that such memory is properly reclaimed.

Figure 2:
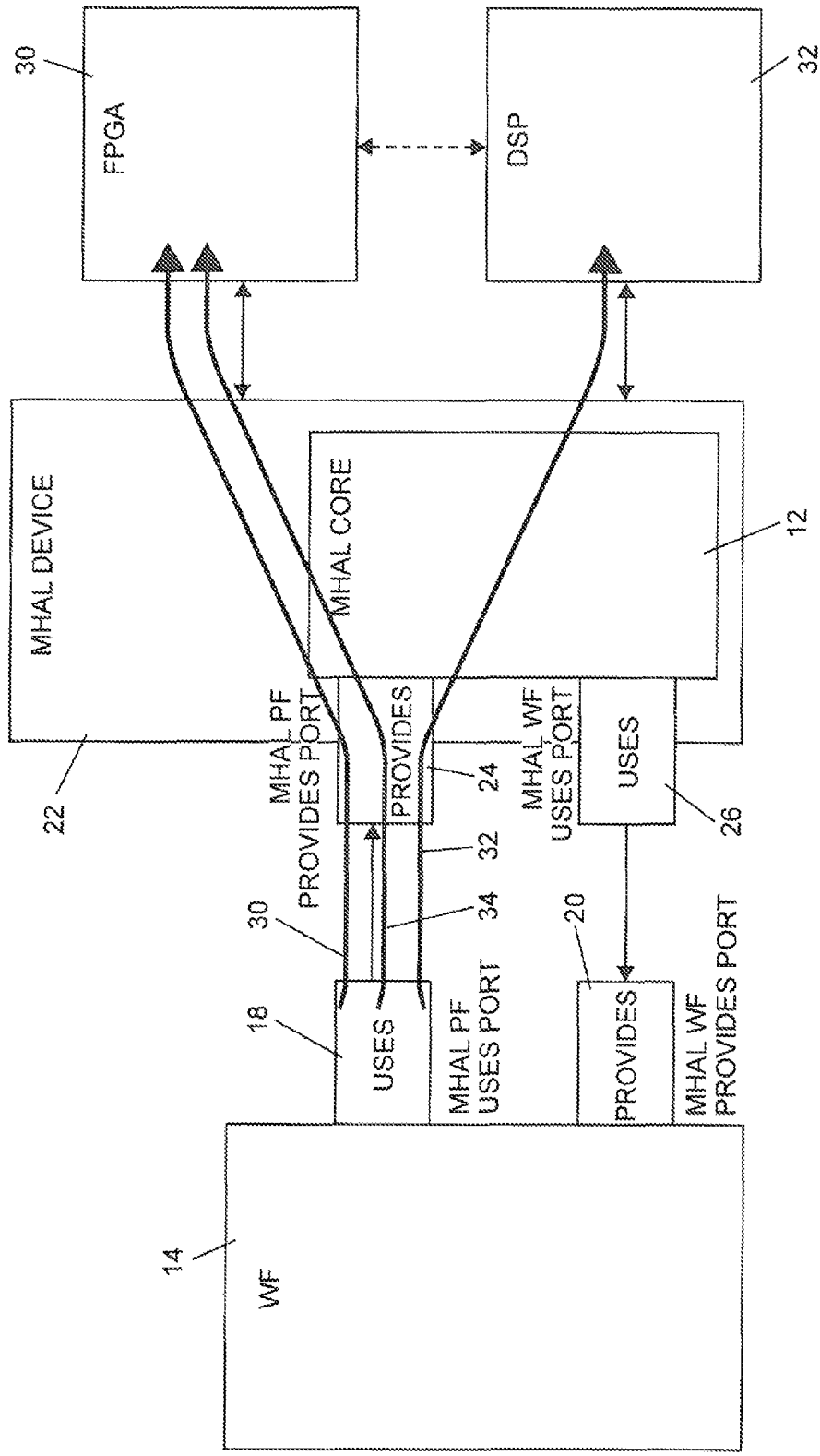
FIG. 2 is a block diagram illustrating a MHAL prioritized thread banding feature of the present invention.

As seen in FIG. 2, the reusable MHAL core module 12 provides flexible, configurable prioritized dispatch thread banding; for example, a high priority band 30, a medium priority band 32, and a synchronous (direct connection) band 34. The banding is associated with the MHAL logical destinations. The core module software preferably supports multiple threads of different priorities to allow waveform communication to be implemented with greater efficiency, and to address quality of service (QoS) issues.

The dispatch bands 30, 32, 34 in FIG. 2 can be configured in a known manner by the MHAL software device 22 by direct code configuration and/or by parameters provided in XML (which takes precedence over coded values), and can range from only synchronous (e.g., the default) to as many bands as needed or which a specific environment will support.

As mentioned, the band assigned to a given message depends on its MHAL logical destination; that is, the routing information provided with the message pushed into the MHAL. Configurable parameters may include priority, stack size, and an ability to keep threads running during periods when the MHAL software device 22 is "stopped" or "started" as those mechanisms are defined in the SCA for a device.

As disclosed herein, the inventive MHAL software allows custom MHAL solutions to be generated more rapidly by way of the core module 12, and reduces a need for adjusting waveform software when moved from one hardware platform to another. The time and cost to develop the overall MHAL software and to port associated waveform software, are therefore considerably reduced.

While the foregoing represents preferred embodiments of the present invention, it will be understood by persons skilled in the art that various modifications, additions, and changes can be made without departing from the spirit and scope of the invention, and that the invention includes all such modifications and changes that are within the scope of the appended claims.

We claim:

1. A method of producing a modem for a given Software Communications Architecture (SCA) compliant radio having a field programmable gate array (FPGA) and an associated first processor, the method conforming to the modem hardware abstraction layer (MHAL) standard, comprising:

providing a MHAL software device within a second processor associated with the modem, and configuring the second processor to process data and exchange messages among a waveform software application and the radio;

providing a core module in the MHAL software device, and configuring the core module to contain a set of software that is common to and compatible with a number of different SCA compliant radios including the given radio, for enabling the radios to use standard MHAL interfaces and services required by the radios;

providing a custom module in the MHAL software device;

configuring the custom module to contain only such software that is specific to the FPGA and the first processor associated with the given radio, and, with the common software contained in the core module, to enable the given radio to use the MHAL interfaces and services required by the radio; and configuring the core module for priority thread banding of messages according to a MHAL logical destination of a given message, by assigning a pool of threads to a specific priority band so that incoming messages to be routed are serviced immediately via a list of available threads.

2. A method according to claim 1, wherein the thread banding includes at least two bands for messages having different priorities.

3. A method according to claim 1, wherein the thread banding includes a synchronous direct connection band at a priority of a call instead of asynchronous dispatching band priority.

4. A method according to claim 1, including configuring the custom module to provide the given radio with software for enabling the second processor associated with the modem to send messages to the given radio over a platform specific bus.

5. A method according to claim 4, including arranging the bus in the form of a PCI bus.

6. A method according to claim 1, including configuring the custom module to provide the given radio with software for performing a built-in-test (BIT) of a radio hardware.

* * * * *